(12) United States Patent
Mirzaei et al.

(10) Patent No.: US 8,862,077 B2
(45) Date of Patent: *Oct. 14, 2014

(54) GAIN CONTROL USING A DYNAMICALLY CONFIGURABLE TRANSFORMER

(71) Applicant: Broadcom Corporation, Irvine, CA (US)

(72) Inventors: Ahmad Mirzaei, Costa Mesa, CA (US); John Leete, Huntington Beach, CA (US); Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,589

(22) Filed: Jul. 15, 2013

(65) Prior Publication Data

US 2013/0303095 A1    Nov. 14, 2013

Related U.S. Application Data

(63) Continuation of application No. 11/947,269, filed on Nov. 29, 2007, now Pat. No. 8,515,368.

(51) Int. Cl.
*H04B 1/04* (2006.01)
*H04B 1/62* (2006.01)

(52) U.S. Cl.
CPC .............. *H04B 1/62* (2013.01); *H04B 1/0458* (2013.01); *H04B 2001/0416* (2013.01)
USPC .............. 455/127.2; 455/115.1; 455/232.1; 455/292

(58) Field of Classification Search
USPC ................ 455/127.2, 91, 115.1, 118, 232.1, 455/234.1, 235.1, 240.1, 241.1, 248.1, 455/249.1, 292, 293, 125, 120, 123–124
See application file for complete search history.

(56) References Cited

U.S. PATENT DOCUMENTS

| | | | |
|---|---|---|---|
| 5,553,319 A | 9/1996 | Tanbakuchi | |
| 6,009,318 A | 12/1999 | Freed | |
| 6,466,770 B1 | 10/2002 | Griffith et al. | |
| 6,959,178 B2 | 10/2005 | Macedo et al. | |
| 6,980,776 B2 | 12/2005 | Shimada et al. | |
| 6,992,543 B2 | 1/2006 | Luetzelschwab et al. | |
| 7,072,636 B2 | 7/2006 | Dobrovolny | |
| 7,088,214 B2 | 8/2006 | Castaneda et al. | |
| 7,129,803 B2 | 10/2006 | Khorram et al. | |
| 7,145,390 B2 | 12/2006 | Pan | |
| 7,209,727 B2 | 4/2007 | Castaneda et al. | |
| 7,269,391 B2 | 9/2007 | Chiu et al. | |
| 7,274,913 B2 * | 9/2007 | Marholev et al. | 455/78 |
| 7,391,596 B2 * | 6/2008 | Khorram | 361/58 |
| 7,461,281 B2 * | 12/2008 | Miyazaki | 713/323 |
| 7,526,256 B2 | 4/2009 | Bhatti et al. | |
| 7,728,661 B2 * | 6/2010 | Bockelman et al. | 330/51 |
| 7,851,947 B2 | 12/2010 | Cassia et al. | |
| 8,068,795 B2 * | 11/2011 | Bavisi et al. | 455/103 |
| 8,095,082 B2 | 1/2012 | Deng et al. | |
| 2006/0141976 A1 | 6/2006 | Rohde et al. | |
| 2007/0064833 A1 | 3/2007 | Sahota | |

(Continued)

*Primary Examiner* — Pablo Tran
(74) *Attorney, Agent, or Firm* — McDermott Will & Emery LLP (57) ABSTRACT

An apparatus includes a dynamically configurable transformer configured to provide a gain to a target signal. The gain is dynamically configurable. The dynamically configurable transformer includes at least one parallel resistive element configured to be dynamically activated in parallel with a load.

20 Claims, 5 Drawing Sheets

(56) References Cited

U.S. PATENT DOCUMENTS

| | | | |
|---|---|---|---|
| 2007/0087711 A1* | 4/2007 | Pan | 455/127.4 |
| 2007/0270111 A1* | 11/2007 | Pan | 455/127.1 |
| 2008/0032639 A1 | 2/2008 | Kee et al. | |
| 2009/0098831 A1 | 4/2009 | Deng et al. | |
| 2009/0153250 A1* | 6/2009 | Rofougaran | 330/297 |
| 2010/0026368 A1* | 2/2010 | Tang et al. | 327/361 |
| 2010/0040178 A1* | 2/2010 | Sutton et al. | 375/345 |

\* cited by examiner

GAIN CONTROL USING A DYNAMICALLY CONFIGURABLE TRANSFORMER

CROSS-REFERENCE TO RELATED APPLICATIONS

This application is a continuation of U.S. patent application Ser. No. 11/947,269, filed on Nov. 29, 2007, and titled "Gain Control Using a Dynamically Configurable Transformer," which is incorporated by reference herein in its entirety.

TECHNICAL FIELD

This description generally relates to the control of the gain of an electrical signal, and more specifically to control the gain of a communication signal utilizing a transformer.

BACKGROUND

Wideband Code Division Multiple Access (WCDMA) in this context is often a type of third generation (3G) cellular network. More technically, WCDMA is often a wideband spread-spectrum mobile air interface that utilizes the direct sequence Code Division Multiple Access (CDMA) signaling method to achieve higher speeds and support more users compared to the implementation of time division multiplexing (TDMA) used by second generation (2G) networks. It is understood that WCDMA is merely one non-limiting communication technique to which the disclosed subject matter may be applied.

Often a WCDMA device will include a form of gain control. This may generally allow a user to control the strength of a signal transmitted by the WCDMA device. In a typical WCDMA transmitter some portion of the gain-control is built into a pre-amplification driver and the rest of the gain control is frequently distributed amongst a transceiver mixer and base-band filter. The gain control is frequently divided into discrete chunks, called "gain steps".

SUMMARY

A system and/or method for communicating information, substantially as shown in and/or described in connection with at least one of the figures, as set forth more completely in the claims.

DETAILED DESCRIPTION

Figure 1:
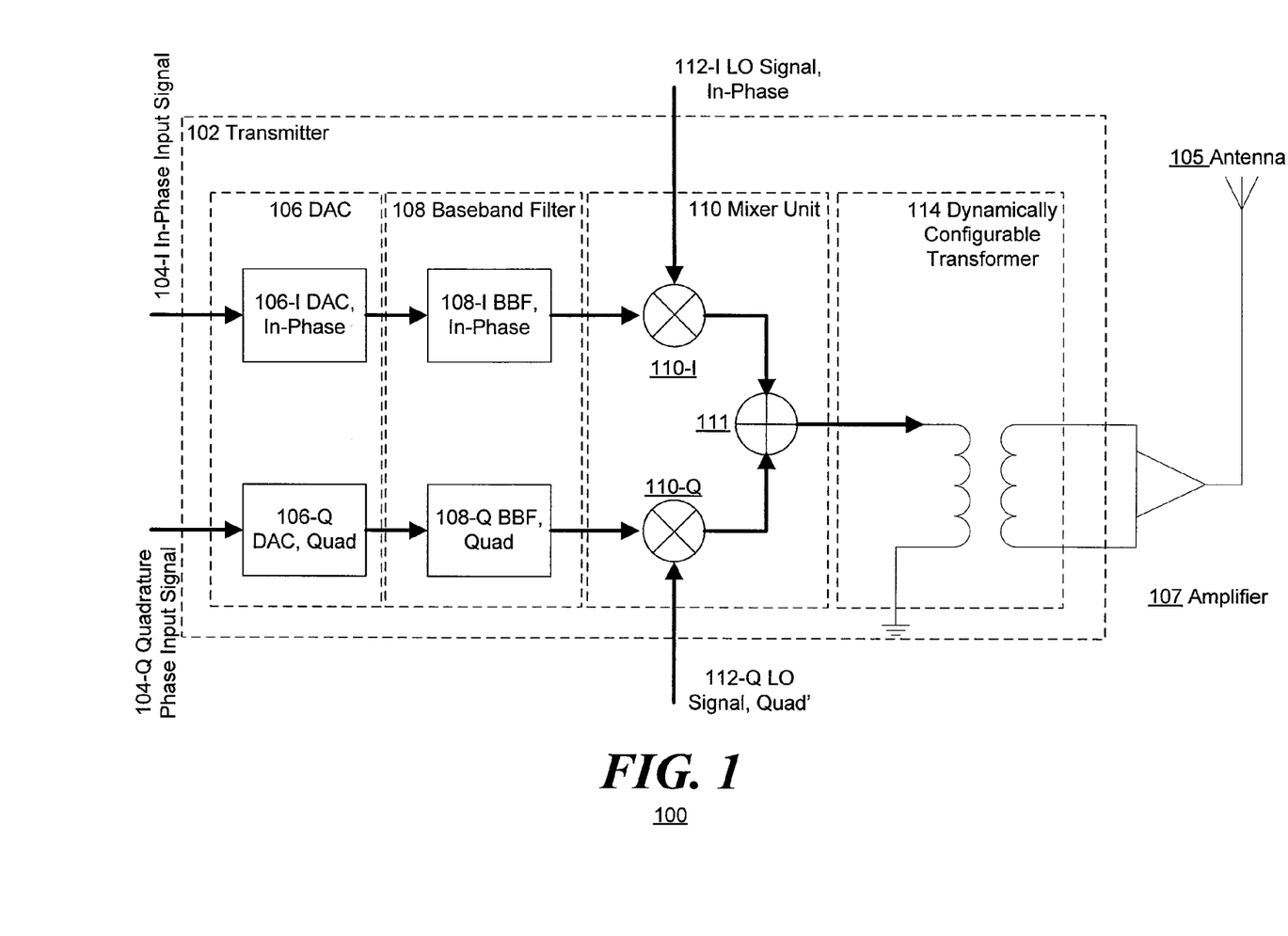
FIG. 1 is a block diagram of a system for controlling the gain of an electrical signal in accordance with the disclosed subject matter.

FIG. 1 is a block diagram of a system 100 in accordance with the disclosed subject matter for controlling the gain of an electrical signal. In one embodiment, the system 100 may include a transmitter 102, an amplifier 107 and an antenna 105. In one embodiment, the transmitter 102 may be configured to receive an input signal and produce an output signal. In one embodiment, the transmitter 102 may be included or be an integrated circuit or a microchip. In one embodiment, the input signal may include an in-phase portion (In-phase input signal 104-I) and a quadrature phase portion (Quadrature-phase input signal 104-Q). In one embodiment, the amplifier 107 may be configured to produce an amplification of the output signal. In one embodiment, the antenna 105 may be configured to facilitate a transmission of the amplified output signal.

In one embodiment, the transmitter 102 may include a digital-to-analog converter (DAC) 106, a baseband filter (BBF) 108, a mixer unit 110, and a dynamically configurable transformer 114. In one embodiment, the DAC 106 may be configured to convert a digital signal into an analog signal. In one embodiment, the DAC 106 may include an in-phase portion (DAC, In-phase 106-I) and a quadrature phase portion (DAC, Quadrature 106-Q) configured to receive the In-phase input signal 104-I and Quadrature-phase input signal 104-Q, respectively.

In one embodiment, the baseband filter (BBF) 108 may be configured to produce a baseband signal by filtering an input signal. In one embodiment, the BBF 108 may include an in-phase portion (BBF, In-phase 108-I) and a quadrature phase portion (BBF, Quadrature 108-Q) configured to receive the in-phase output of DAC 106-I or the quadrature output of the DAC 106-Q, respectively. In various embodiments without a DAC 106, the BBF 108 may receive the input signal (and any in-phase and quadrature components of the input signal) directly.

In one embodiment, the mixer unit 110 may be configured to produce an intermediate signal which is a sum of multiplications of portions of the baseband signal and portions of a local oscillator signal. In one embodiment, the local oscillator signal may include an in-phase portion (In-phase local oscillator signal 112-I) and a quadrature phase portion (Quadrature-phase local oscillator signal 112-Q). In one embodiment, the mixer unit 110 may include an in-phase multiplier 110-I configured to multiply an in-phase portion of the baseband signal and an in-phase local oscillator signal 112-I. In one embodiment, the mixer unit 110 may include a quadrature-phase multiplier 110-Q configured to multiply a quadrature-phase portion of the baseband signal and a quadrature-phase local oscillator signal 112-Q. It is understood that, in various embodiments, the multipliers may include more complex structures and that the illustrated multipliers are merely one illustrative non-limiting embodiment of the disclosed subject matter. In one embodiment, the mixer unit 110 may include a number of mixer unit cells configured to increase the gain experienced by an electronic signal by a step increment, and wherein the step increment is substantially constant regardless of temperature. In one embodiment, the mixer unit 110 may include a summer 111 configured to sum the results of the multipliers 110-I & 110-Q.

In one embodiment, the transmitter 102 may include a dynamically configurable transformer (DCT) 114. In one embodiment, the dynamically configurable transformer 114 may be configured to provide an output signal by amplifying the intermediate signal, wherein the amount of amplification is dynamically configurable. In one embodiment, the intermediate signal may be provided by the mixer unit 110 and may include a number of portions. In one embodiment, the selection of the gain provided by the dynamically configurable transformer (DCT) 114 may be selected and changed dynamically.

In one embodiment, the gain provided by the dynamically configurable transformer (DCT) 114 may include at least one gain step. In one embodiment, the dynamically configurable transformer (DCT) 114 may be configured to provide a plurality of gains. For example, in one non-limiting embodiment, the DCT 114 may provide a maximum possible gain step of 18 dB via three gain steps (or increments) of 6 dB each. In such an embodiment, the DCT 114 may provide possible gain steps of 0 db, 6 dB, 12 dB, and 18 dB. It is understood that, in one embodiment, other gains may be applied by other elements of the system 100, and not just, in one embodiment, the DCT 114.

In one embodiment, each gain step may be substantially constant regardless of temperature. For example, if each gain step equals 6 dB, to pick a non-limiting illustrative gain step value, the gain step may be substantially constant regardless of the temperature of the dynamically configurable transformer (DCT) 114. In a specific example, a user in Helsinki may be indoors where the temperature is 27 C and experience a gain step of 6 dB. If that user goes outside where the temperature is −3 C, a gain step of substantially 6 dB should, in one embodiment, be experienced. It is understood that is merely one specific non-limiting illustrative example and that the disclosed subject matter is not limited to any particular location, temperature or gain step value.

Figure 2A:
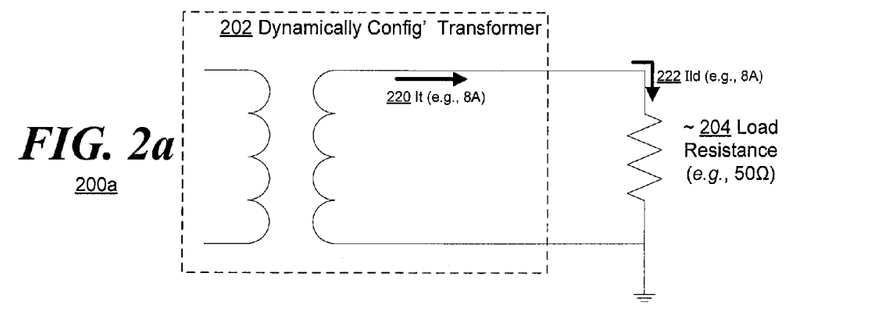
FIGS. 2a, 2b, & 2c are schematic diagrams of a system for controlling the gain of an electrical signal in accordance with the disclosed subject matter.
Figure 2B:
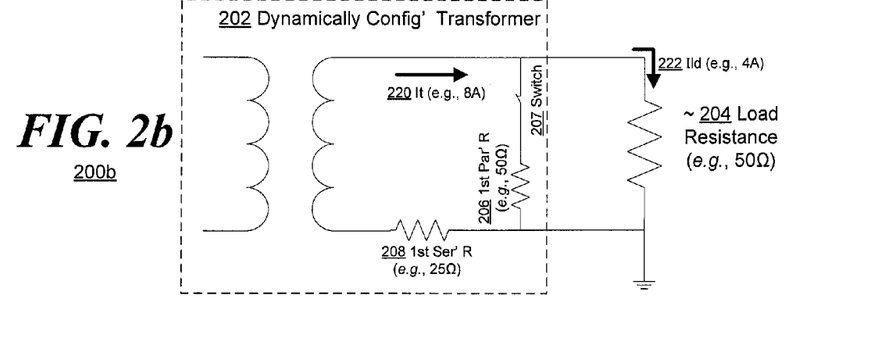
Figure 2C:
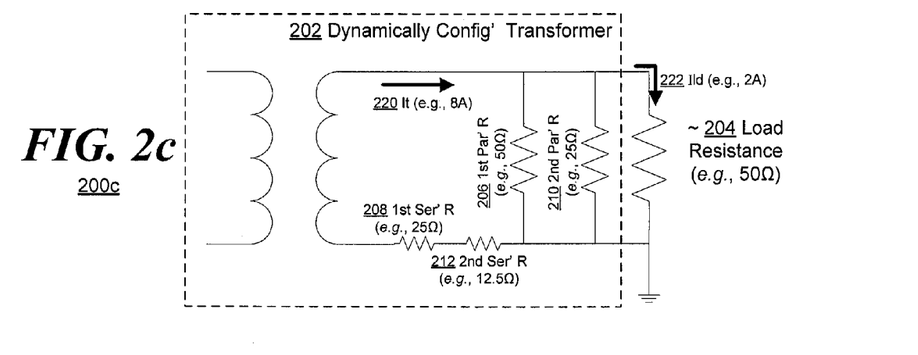

FIGS. 2a, 2b, & 2c are schematic diagrams of a system 200 in accordance with the disclosed subject matter for controlling the gain of an electrical signal. In one embodiment, the system 200 may include a dynamically configurable transformer (DCT) 202 and a load resistance 204 (also referred to as the "load 204"). In one embodiment, the load resistance 204 may be or may be thought of as a simple resistor. However, it is understood that, in one embodiment, the load may include a number of elements and that the load resistance 204 may simply be a model of the effective resistance of those elements.

In one embodiment, the dynamically configurable transformer (DCT) 202 may include a first winding configured to receive an input signal. In one embodiment, this first winding may be coupled with a mixer unit, such as mixer unit 110 of FIG. 1. In one embodiment, the dynamically configurable transformer (DCT) 202 may include a second winding configured to produce a load current. In one embodiment, the load resistance 204 may be coupled with a second winding.

FIG. 2a illustrates an embodiment in which the dynamically configurable transformer (DCT) 202 provides a maximum gain to the input signal received by the first winding. In one embodiment, the maximum gain may be 0 dB; however, it is understood that a certain level of gain may be achieved simply by the ratio between the first and second windings of the transformer 202. In one example embodiment, the effective resistance of the load resistance 204 may be 50 Ohms (Ω), although it is understood that this is merely one non-limiting example of the disclosed subject matter. In one embodiment, the second winding may provide a transformer current ($I_t$) 220. In one embodiment, the transformer current ($I_t$) 220 may be 8 Amps; however, it is understood that this is merely an arbitrary illustrative value to which the disclosed subject matter is not limited. In one embodiment, the load resistance 204 may receive a load current ($I_{ld}$) 222. In the illustrated embodiment, the load current 222 shown in FIG. 2a may be 8 Amps. In one embodiment, the power of the output signal received by the load 204 may be proportional to the load current ($I_{ld}$) 222.

FIG. 2b illustrates an embodiment, in which a gain step is applied to the input signal. In one embodiment, it may be desirable to attenuate the input signal by providing negative gain. In one embodiment, the dynamically configurable transformer (DCT) 202 may include at least one parallel resistor element 206 that may be dynamically activated in parallel with the load 204, and at least one serial resistor element 208 that may be dynamically activated effectively in series with the load 204. In one embodiment, the first parallel resistor element 206 may be equivalent to the effective load resistance 204 (e.g., 50Ω). Thus, in this illustrative embodiment, the load current ($I_{ld}$) 222 may be halved to 4 Amps. However, it may be desirable, in one embodiment, to maintain a substantially constant effective load resistance experienced by the first winding. Therefore, the first serial resistor element 208 may have a value (e.g., 25Ω) selected such that the input impedance or total resistance experienced by the first winding in FIG. 2b (e.g., 50Ω) is substantially equivalent to that experienced by the first winding in FIG. 2a (e.g., 50Ω).

In one embodiment, each parallel resistor element (e.g., first parallel resistor element 206) may be matched with a corresponding serial resistor element (e.g., first serial resistor element 208), and the matched parallel and serial resistor element pair may be configured to be dynamically activated or deactivated substantially simultaneously. In one embodiment, the first parallel resistor element 206 may be activated or deactivated utilizing a switch 207. It is understood, although not shown so as not to obscure the figures, that an equivalent switch may activate or deactivate the serial resistor element 208 and the dynamic elements of FIG. 2c, in one embodiment.

FIG. 2c illustrates an embodiment in which a second gain step is applied to the input signal. In one embodiment, it may be desirable to attenuate the input signal by providing negative gain. In one embodiment, the dynamically configurable transformer (DCT) 202 may further include a second parallel resistor element 210 that may be dynamically activated in parallel with the load 204, and a second serial resistor element 212 that may be dynamically activated effectively in series with the load 204. In one embodiment, the second parallel resistor element 210 may be equivalent to the effective resistance (e.g., 25Ω) of the combined resistance of the first parallel resistor element 206 and the load resistance 204 when placed in parallel. Thus, in this illustrative embodiment, the load current ($I_{ld}$) 222 may be quartered to 2 Amps. However, it may be desirable, in one embodiment, to maintain a substantially constant effective load resistance experienced by the first winding. Therefore, the second serial resistor element 212 may have a value (e.g., 12.5Ω) selected such that the total resistance experienced by the first winding in FIG. 2c (e.g., 50Ω) is substantially equivalent to that experienced by the first winding in FIG. 2a (e.g., 50Ω).

In one embodiment, the dynamically configurable transformer (DCT) 202 may be used to attenuate or provide a negative gain to an input signal by activating parallel/serial resistor element pairs, as illustrated by the progression of FIGS. 2a to 2c. However, in one embodiment, dynamically configurable transformer (DCT) 202 may be used to boost or provide a positive gain to an input signal by deactivating parallel/serial resistor element pairs, as would occur by the progression of FIGS. 2c to 2a. In one embodiment, a system 200a may include dynamically configurable transformer (DCT) 202 in which the default configuration is the deactivation of all parallel/serial resistor element pairs. In one embodiment, a system 200c may include a dynamically configurable transformer (DCT) 202 in which the default configuration is the activation of all parallel/serial resistor element pairs. However, other embodiments may exist including different or default configurations for the dynamically configurable transformer (DCT) 202.

Figure 3:
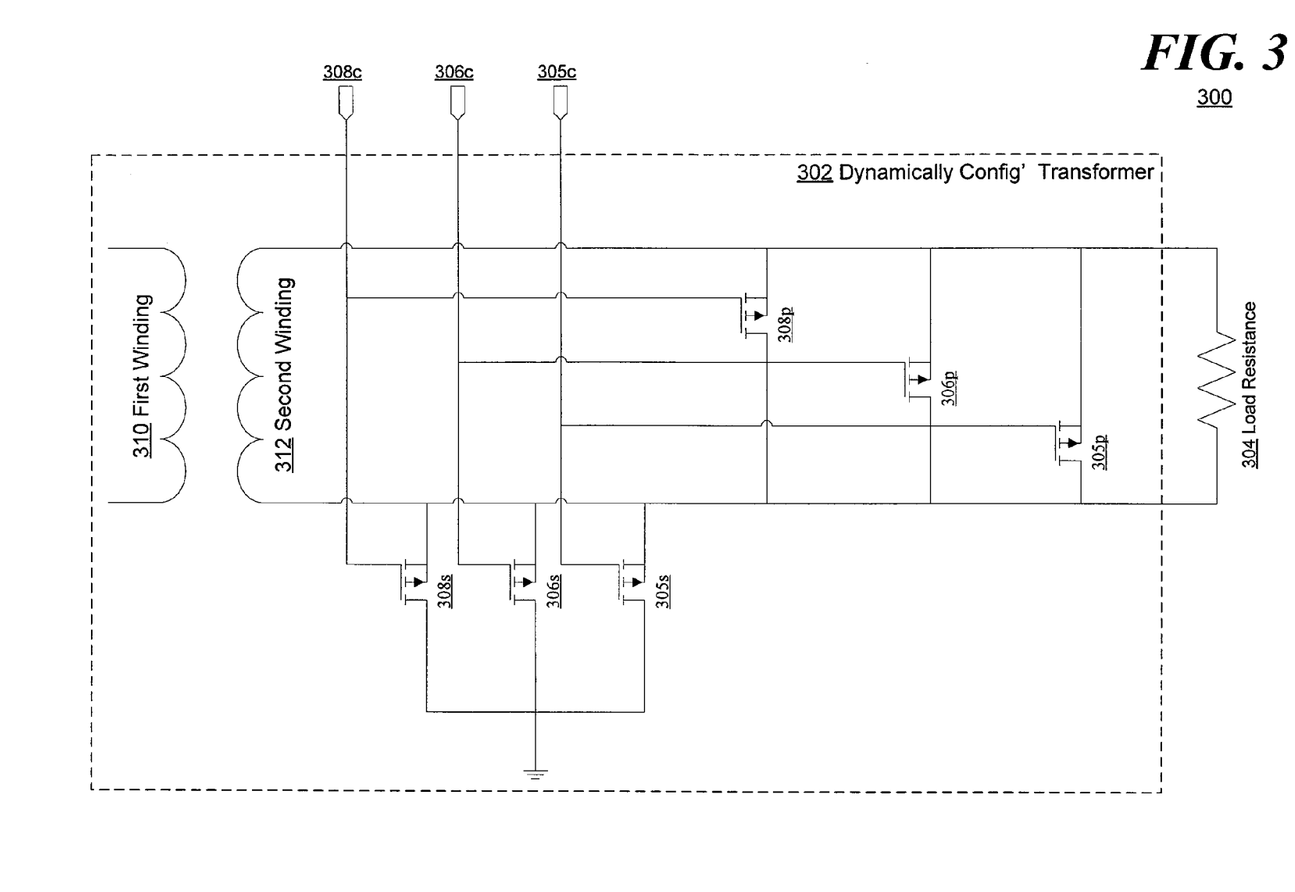
FIG. 3 is a schematic diagram of a system for controlling the gain of an electrical signal in accordance with the disclosed subject matter.

FIG. 3 is a schematic diagram of a system 300 in accordance with the disclosed subject matter for controlling the gain of an electrical signal. In one embodiment, the system 300 may include a dynamically configurable transformer (DCT) 302 and a load resistance 304. In one embodiment, the dynamically configurable transformer (DCT) 302 may include a first winding 310 and a second winding 312. In one embodiment, the second winding 312 may include at least one parallel resistor element that may be dynamically activated in parallel with the load, and at least one serial resistor element that may be dynamically activated effectively in series with the load 204. In one embodiment, the at least one parallel resistor element may include a transistor (e.g., transistor 305p, transistor 306p, or transistor 308p) coupled between a first and a second output terminal of the second winding 312. In one embodiment, the at least one serial resistor element may include a transistor (e.g., transistor 305s, transistor 306s, or transistor 308s) coupled between the second output terminal and a ground. In one embodiment, the serial resistor elements (e.g., transistor 305s, transistor 306s, or transistor 308s) may not be coupled in series with the load resistance 304, but may provide an effect substantially equivalent to a resistance placed in series with the load resistance 304. In one embodiment, the use of transistors, as compared to traditional resistors and switches as illustrated in FIG. 2, may increase the response time of the system and reduce the complexity of the system; however, it is understood that these are merely two illustrative design considerations and are not limiting on the disclosed subject matter.

In one embodiment, the parallel transistor 305p may be paired with serial transistor 305s. In one embodiment, both the parallel transistor 305p and serial transistor 305s may be configured to active and deactivate substantially simultaneously utilizing control signal 305c. In one embodiment, the control signal 305c may be coupled with the gates of parallel transistor 305p and serial transistor 305s. In one embodiment, the resistance of parallel transistor 305p and serial transistor 305s may be controlled by the width of the respective transistors.

In one embodiment, the parallel transistor 306p may be paired with serial transistor 306s. In one embodiment, both the parallel transistor 306p and serial transistor 306s may be configured to activate and deactivate substantially simultaneously utilizing control signal 306c. In one embodiment, the control signal 306c may be coupled with the gates of parallel transistor 306p and serial transistor 306s. In one embodiment, the resistance of parallel transistor 306p and serial transistor 306s may be controlled by the width of the respective transistors.

In one embodiment, the parallel transistor 308p may be paired with serial transistor 308s. In one embodiment, both the parallel transistor 308p and serial transistor 308s may be configured to active and deactivate substantially simultaneously utilizing control signal 308c. In one embodiment, the control signal 308c may be coupled with the gates of parallel transistor 308p and serial transistor 308s. In one embodiment, the resistance of parallel transistor 308p and serial transistor 308s may be controlled by the width of the respective transistors.

Figure 4:
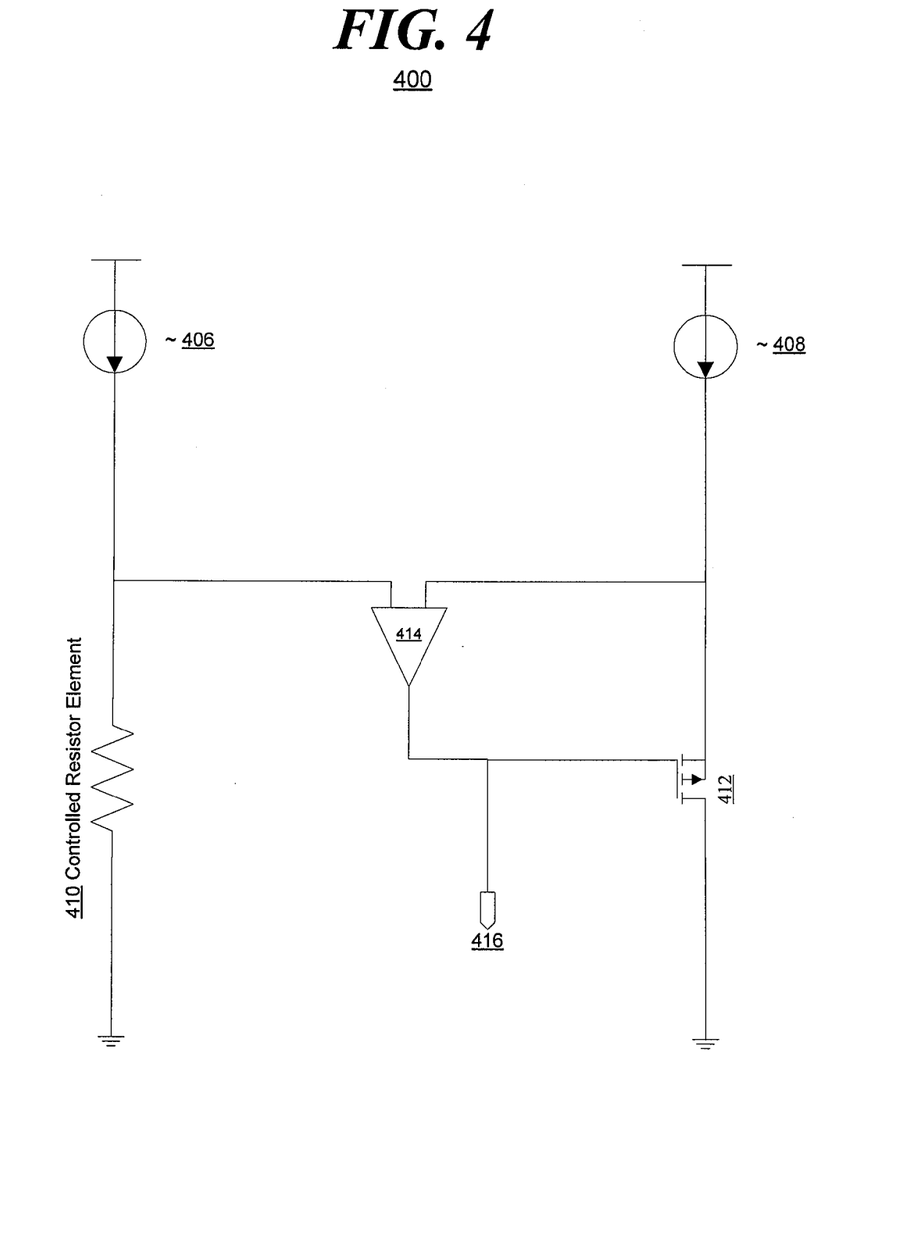
FIG. 4 is a schematic diagram of a system for controlling the gain of an electrical signal in accordance with the disclosed subject matter.

FIG. 4 is a schematic diagram of a temperature control circuit 400 in accordance with the disclosed subject matter for controlling the gain of an electrical signal. In one embodiment, the resistor elements, and specifically the transistor elements shown in FIG. 3, may include characteristics that vary based upon temperature (e.g., carrier mobility). In one embodiment, it may be desirable to control or configure the dynamically configurable transformer (DCT) 302 to include gain steps that are substantially constant regardless of temperature. In one embodiment, a system may include a temperature control circuit 400 configured to attempt to maintain the resistor elements which in one embodiment may be a metal-oxide-semiconductor field-effect transistors (MOSFET) of a dynamically configurable transformer (DCT) (e.g., DCT 302) at a constant resistance value, regardless of temperature.

In one embodiment, the temperature control circuit 400 may include a controlled resistor element 410, a test resistor element 412, a current source 406, a test current source 408, and a comparator element 414. In one embodiment, the controlled resistor element 410 may be configured to act as a constant resistance regardless of temperature. In one embodiment, the controlled resistor element 410 may reside outside of the integrated circuit or microchip that includes the system dynamically configurable transformer (DCT) (e.g., DCT 302). As such, in one embodiment, the resistance value of the controlled resistor element 410 may effectively be a guaranteed or trusted value. In one embodiment, the current source 406 may supply a current through the controlled resistor element 410. This may result in a voltage across the controlled resistor element 410.

In one embodiment, the test resistor element 412 may be configured to be substantially identical to a selected parallel resistor element (e.g., transistor 305p) of the second winding of the dynamically configurable transformer (DCT) (e.g., DCT 302). In one embodiment, this may allow the temperature control circuit 400 to determine how the resistance value of the selected parallel resistor element (e.g., transistor 305p) varies with respect to temperature or other conditions. In one embodiment, the test current source 408 may supply a current through the test resistor element 412. This may result in a voltage across the test resistor element 412. In one embodiment, the current source 406 and the test current source 408 may supply substantially equivalent currents. In one embodiment, the two current sources 406 & 408 may be a same-type current source.

In one embodiment, temperature control circuit 400 may include a comparator element 414 configured to compare the voltages across each of the controlled resistor 410 and the test resistor element 412, and to control the test resistor element 412 such that the test resistor element 412 has a resistance substantially equivalent to the controlled resistor 410. In one embodiment, the temperature control circuit 400 may produce a control signal 416 utilizing, at least in part, the voltages across each of the controlled resistor 410 and the test resistor element 412. In one embodiment, this control signal 416 may be coupled with the gate of the test resistor element 412. In one embodiment, the voltage of the control signal 416 may be increased or decreased until the voltages across each of the controlled resistor 410 and the test resistor element 412 are substantially equal. In one embodiment, this adjustment of the control signal 416 may include the utilization of a feedback loop.

In one embodiment, the control signal 416 may be used to control the activation or deactivation of the resistor elements of the dynamically configurable transformer (e.g., DCT 302). In the embodiment illustrated by FIG. 3, the dynamically configurable transformer (DCT) 302 may be configured such that when the transistors of the parallel resistor elements 305p, 306p, & 308p and the serial resistor elements 305s, 306s, & 308s are dynamically activated, the control signal 416 is applied to a gate of the respective transistors. For example, when the parallel/serial resistor element pair 305p & 305s are activated, the control signal 406 may be applied to the control signal 305c. Likewise, when the parallel/serial resistor element pair 306p & 306s are activated, the control signal 406 may be applied to the control signal 306c. In one embodiment, despite the different resistive values (or, in one embodiment, the widths) of parallel/serial resistor element pair 305p & 305s and parallel/serial resistor element pair 306p & 306s, the control signal 406 may allow the resistor elements to maintain a substantially constant regardless of temperature.

Figure 5:
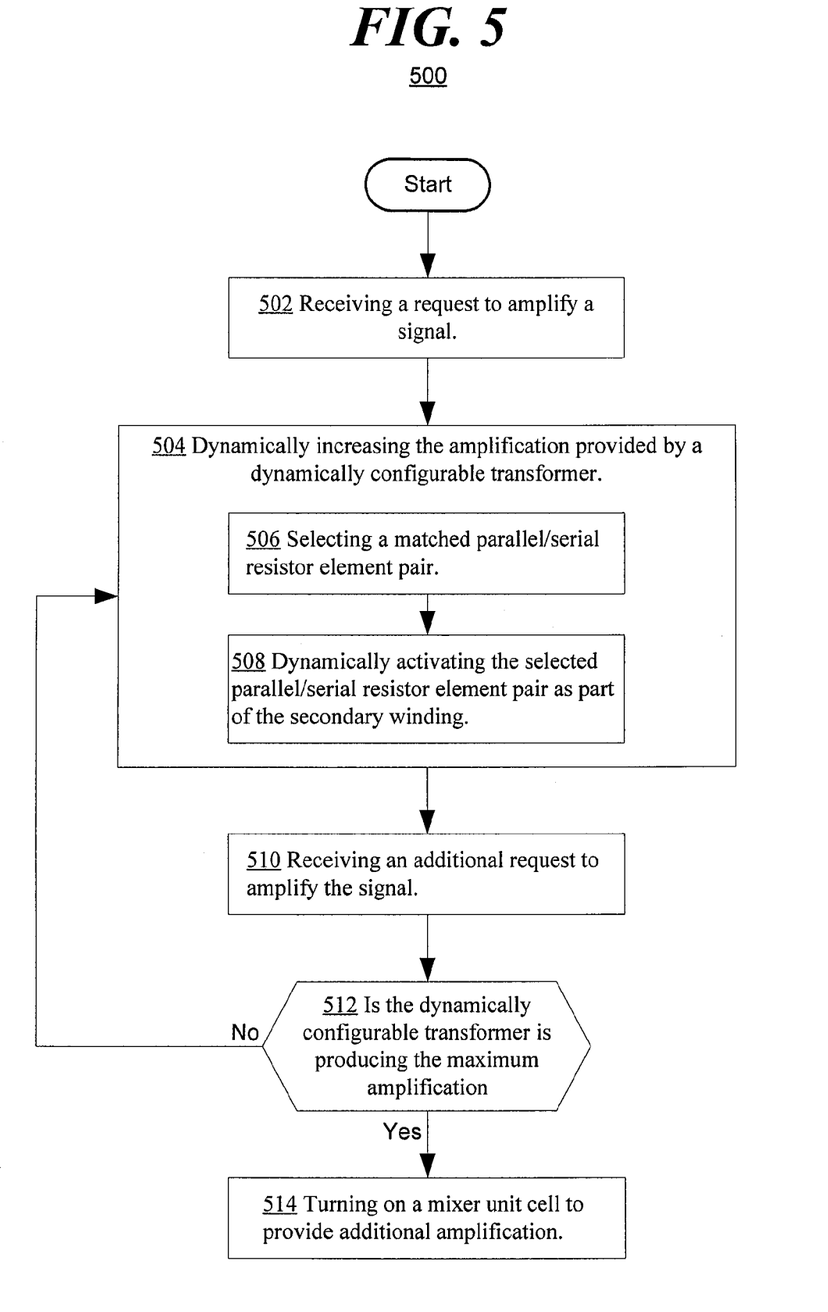
FIG. 5 is a flowchart of a technique for controlling the gain of an electrical signal in accordance with the disclosed subject matter.

FIG. 5 is a flowchart of a technique 500 in accordance with the disclosed subject matter for controlling the gain of an electrical signal. Block 502 illustrates that, in one embodiment, a request to amplify a signal may be received. In one embodiment, the signal may be an electrical signal. In one embodiment, the signal may be utilized as part of a Wideband Code Division Multiple Access (WCDMA) protocol. In one embodiment, the dynamically configurable transformer (DCT) 114 of FIG. 1 may receive this request, as described above.

Block 504 illustrates that, in one embodiment, the amplification provided by a dynamically configurable transformer (DCT) may be changed. In one embodiment, the amplification may be increased. In one embodiment, the amplification may be decreased. In one embodiment, the dynamically configurable transformer (DCT) 114 of FIG. 1 may dynamically change the amplification, as described above.

Block 506 illustrates that, in one embodiment, a matched parallel/serial resistor element pair may be selected. In one embodiment, the dynamically configurable transformer (DCT) 114 of FIG. 1 may make this selection, as described above. In one embodiment, the various resistor elements shown in FIGS. 2 and 3 may be selected, as described above.

Block 508 illustrates that, in one embodiment, the selected parallel/serial resistor element pair may be activated. In one embodiment, the selected parallel/serial resistor element pair may be deactivated. In one embodiment, the selected parallel/serial resistor element pair may effectively be placed into the second winding of the dynamically configurable transformer (DCT). In one embodiment, the dynamically configurable transformer (DCT) 114 of FIG. 1 may activate or deactivate the resistor elements, as described above. In one embodiment, the various resistor elements shown in FIGS. 2 and 3 may be activated or deactivated, as described above.

Block 510 illustrates that, in one embodiment, an additional request to amplify the signal may be received. In one embodiment, the amplification may be increased. In one embodiment, the amplification may be decreased. In one embodiment, the dynamically configurable transformer (DCT) 114 of FIG. 1 may receive the request, as described above.

Block 512 illustrates that, in one embodiment, a determination of whether or not the dynamically configurable transformer (DCT) is producing the maximum amplification may be made. In one embodiment, this determination may only be made if the request to change the amplification is for additional amplification. In one embodiment, the dynamically configurable transformer (DCT) 114 of FIG. 1 may make this determination, as described above.

If additional amplification may be provided by the dynamically configurable transformer (DCT), in one embodiment, the actions illustrated by Blocks 504 may be repeated. Block 512 illustrates that, in one embodiment, if no additional amplification may be provided by the dynamically configurable transformer (DCT), a mixer unit cell or a portion of a mixer unit may be turned on or activated to provide the requested additional amplification. In one embodiment, the mixer unit 110 of FIG. 1 may provide this amplification, as described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
a dynamically configurable transformer configured to provide a gain to a target signal,
wherein the gain is dynamically configurable, and
wherein the dynamically configurable transformer includes at least one parallel resistive element configured to be dynamically activated in parallel with a load.

2. The apparatus of claim 1, further comprising:
a baseband filter configured to generate a baseband signal based on an input signal; and
a mixer unit configured to generate an intermediate signal based on the baseband signal and a local oscillator signal,
wherein the target signal comprises the intermediate signal.

3. The apparatus of claim 1, wherein the gain provided by the dynamically configurable transformer includes at least one gain step.

4. The apparatus of claim 3, wherein the at least one gain step is substantially constant regardless of a temperature of the apparatus.

5. The apparatus of claim 1, wherein the dynamically configurable transformer includes:
a first winding configured to receive the target signal from a mixer unit; and
a second winding configured to be, during operation, coupled with the load having an effective resistance and receiving a load current; and
at least one serial resistive element configured to be dynamically activated effectively in series with the load.

6. The apparatus of claim 5, wherein each parallel resistive element is matched with a corresponding serial resistive element, and wherein each matched parallel and serial resistive element pair is configured to be dynamically activated substantially simultaneously.

7. The apparatus of claim 5, wherein each parallel resistive element includes a transistor coupled between a first and a second output terminal of the second winding, and wherein each serial resistive element includes a transistor coupled between the second output terminal and a ground.

8. The apparatus of claim 6, wherein the second winding and each matched parallel and serial resistive element pair are configured such that, as each matched parallel and serial resistive element pair is dynamically activated, the load current received by the load is reduced, but an effective load resistance experienced by the first winding remains substantially constant.

9. The apparatus of claim 5, further comprising a temperature control circuit configured to maintain the resistive elements at substantially a constant resistance value regardless of temperature.

10. The apparatus of claim 9, wherein the temperature control circuit includes:
a controlled resistor configured to act as a constant resistance regardless of temperature;
a test resistive element configured to be substantially identical to a selected parallel resistive element;
one or more current sources configured to supply both the controlled resistor and the test resistive element with substantially identical currents; and
a comparator element configured to compare voltages across each of the controlled resistor and the test resistive element, and to control the test resistive element such that the test resistive element has a resistance substantially equivalent to the controlled resistor.

11. The apparatus of claim 10, wherein the test resistive element, the at least one parallel resistive element, and the at least one serial resistive element each respectively comprise a transistor having a gate, wherein the comparator element is configured to control the test resistive element by a production of a control signal that is applied to the gate of the transistor of the test resistive element, and wherein, when the transistors of the at least one parallel resistive element and the at least one serial resistive element are dynamically activated, the control signal is applied to the gate of the respective transistors.

12. A method comprising:
amplifying, by a dynamically configurable transformer, a target signal,
wherein the dynamically configurable transformer includes at least one parallel resistive element, and
wherein amplifying the target signal comprises dynamically activating the at least one parallel resistive element in parallel with a load.

13. The method of claim 12, wherein amplifying the target signal further comprises:
receiving, by a first winding of the dynamically configurable transformer, the target signal;
coupling a second winding of the dynamically configurable transformer with the load,
wherein the load has an effective resistance and receives a load current; and
dynamically activating at least one serial resistive element of the dynamically configurable transformer in series with the load.

14. The method of claim 12, further comprising:
receiving a request to further amplify the target signal;
turning on a mixer unit cell to provide the further amplification if the dynamically configurable transformer is already producing a maximum amplification at a time of the request; and
providing, by the dynamically configurable transformer, the further amplification if the dynamically configurable transformer is not already producing the maximum amplification at the time of the request.

15. A dynamically configurable transformer comprising:
a first winding configured to receive a first signal;
a second winding configured to generate a second signal based on the first signal,
wherein the second winding is configured to couple to a load and to provide the second signal to the coupled load; and
at least one parallel resistive element configured to be dynamically activated in parallel with the coupled load such that a gain of the second signal relative to the first signal is dynamically adjusted.

16. The transformer of claim 15, further comprising at least one serial resistive element configured to be dynamically activated in series with the load.

17. The transformer of claim 16, wherein each parallel resistive element is matched with a respective serial resistive element.

18. The transformer of claim 17, wherein each matched parallel and serial resistive element pair is configured to be dynamically activated substantially simultaneously.

19. The transformer of claim 18, wherein the second winding and each matched parallel and serial resistive element pair are configured such that, as each matched parallel and serial resistive element pair is dynamically activated, a current of the second signal provided to the load is reduced, but an effective load resistance experienced by the first winding remains substantially constant.

20. The transformer of claim 16, wherein the second winding comprises a first terminal and a second terminal, wherein the at least one parallel resistive element is coupled between the first terminal and the second terminal, and wherein the at least one serial resistive element is coupled between the second terminal and a ground.

* * * * *